(12) United States Patent
Bense et al.

(10) Patent No.: US 8,646,161 B2
(45) Date of Patent: Feb. 11, 2014

(54) CLAMPING DEVICE AND METHOD FOR ASSEMBLY OF STRINGER COUPLINGS

(75) Inventors: Rolf Bense, Jork (DE); Axel Sauermann, Helmste (DE); Eugen Gorr, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 174 days.

(21) Appl. No.: 13/267,917

(22) Filed: Oct. 7, 2011

(65) Prior Publication Data

US 2012/0084962 A1 Apr. 12, 2012

Related U.S. Application Data

(60) Provisional application No. 61/390,691, filed on Oct. 7, 2010.

(30) Foreign Application Priority Data

Oct. 7, 2010 (DE) .......................... 10 2010 047 561

(51) Int. Cl.
    *B23Q 1/00* (2006.01)
(52) U.S. Cl.
    USPC .......... 29/283; 29/281.1; 29/281.5; 29/897.2; 269/97
(58) Field of Classification Search
    USPC .......... 29/897, 897.2, 281.1, 281.5, 283, 238, 29/458, 525.01, 525.03, 462, 464; 269/95, 269/97; 244/119, 120, 131, 132; 52/800.11, 52/801.1
    See application file for complete search history.

(56) References Cited

U.S. PATENT DOCUMENTS

| | | | |
|---|---|---|---|
| 6,029,352 A * | 2/2000 | Nelson ........................ | 29/897.2 |
| 6,478,922 B1 | 11/2002 | Rosevear et al. | |
| 7,159,822 B2 | 1/2007 | Grantham et al. | |
| 7,823,362 B2 | 11/2010 | Meyer | |
| 2009/0272846 A1 | 11/2009 | Anast et al. | |
| 2010/0320321 A1 | 12/2010 | Sauermann | |
| 2010/0320322 A1* | 12/2010 | Reye et al. ..................... | 244/120 |

FOREIGN PATENT DOCUMENTS

| | | |
|---|---|---|
| DE | 102008010197 A1 | 9/2009 |
| DE | 102008013365 A1 | 10/2009 |

* cited by examiner

*Primary Examiner* — David Bryant
*Assistant Examiner* — Ryan J Walters
(74) *Attorney, Agent, or Firm* — Leydig, Voit & Mayer, Ltd.

(57) ABSTRACT

A clamping device is provided for an assembly of a stringer coupling in a region of a lateral butt joint between a first and a second fuselage section of an aircraft for coaxially connecting a respective first and second stringer of the first and the second fuselage sections, the stringer coupling intersecting a frame element profile in the region of the lateral butt joint. A supporting yoke is configured to bridge the frame element profile in an arc-shaped manner and includes a first end foot supported by the stringer coupling on the first side of the frame element profile and a second end foot supported by the stringer coupling on the second side of the frame element profile. The supporting yoke includes a middle tensioning hook configured to interact with the frame element profile. The first and the second end feet are tensionable against the stringer coupling.

9 Claims, 2 Drawing Sheets

CLAMPING DEVICE AND METHOD FOR ASSEMBLY OF STRINGER COUPLINGS

CROSS REFERENCE TO PRIOR APPLICATIONS

Priority is claimed to U.S. Provisional Application No. 61/390,691, filed Oct. 7, 2010, and German Patent Application No. DE 10 2010 047 561.0, filed Oct. 7, 2010. The entire disclosure of both applications is incorporated by reference herein.

FIELD

The invention relates to a clamping device for the assembly of a stringer coupling.

BACKGROUND

DE 10 2008 013 365 A1 describes a lateral butt joint between two adjacent fuselage sections. The lateral butt joint is formed between the two adjacent fuselage sections, which in each case are sheeted with an outer skin, whose end regions comprise wedge-shaped thickened parts whose inclinations point in opposite directions. Special wedges interact with the aforesaid so as to cause tolerance compensation in radial and axial directions of the fuselage section. In this arrangement a lateral butt-joint plate, which forms part of the frame element profile, comes to rest against the top of the wedges allocated at this position.

Furthermore, the frame element profile comprises a trapezoidal recess, through which two pieces of stringer couplings are inserted so as to be arranged side by side, in order to ensure the connection of stringers that are aligned coaxially relative to each other. In this arrangement each stringer is associated with a fuselage section and ends in front of the peripheral region of the fuselage section at the position in which the lateral butt-joint plate including the wedge is placed. Thus the stringer couplings are used to bridge the frame element profile in order to ensure continuous extension of the stringer in longitudinal direction of the fuselage. Apart from its stiffening function the frame element profile also fulfils a connection function in relation to the adjacent fuselage sections strung together, which fuselage sections are normally riveted by way of said frame element profile. Likewise, the stringer couplings, in a sandwich construction, are riveted to the end regions of the associated stringers and to the outer skin, and in the region of the frame element profile are also riveted to the aforesaid and to the wedges and finally to the outer skin. Apart from this, it has been proposed that the connections be made by means of screws or at least partly by bonding or welding. In this arrangement the selected type of connection essentially depends on the selection of the materials or the components and on the stability requirements.

In the aforementioned patent specification, preferably aluminum alloys, titanium alloys, stainless steel alloys or fiber composite materials, for example carbon-fiber-reinforced epoxy resins or thermoplastic materials, in particular polyetheretherketone (PEEK), are proposed as materials for the outer skin, the frame element profile, the stringers, and the stringer couplings.

Because of the stringent requirements relating to the quality of the connections and the many components that are to be interconnected in a sandwich-like manner, assembly of the stringer couplings in the above-described intersection region between the stringers and the frame elements of a fuselage is quite elaborate and expensive.

From DE 10 2008 010 197 A1 a similar lateral butt joint is described as is an associated method for the assembly of two fuselage sections while creating a butt joint. In this document the fuselage skin comprises a fiber-reinforced plastic material, in particular wound fuselage sections for a commercial aircraft. To make it possible to join these special fuselage sections it is proposed that the fuselage sections to be joined first be positioned against each other. Subsequently, at least one lateral butt-joint plate comprising a fiber-reinforced thermoplastic material is heated and adjusted in such a manner that tolerance compensation between the first and second deviating cross-sectional geometric shapes of the two fuselage sections is made possible. As an alternative, at least one end region of a second fuselage section comprising a fiber-reinforced thermoplastic material can be heated, after which the two fuselage sections are joined. Finally, here again, preferably riveting of the components that are to be joined in a sandwich-like manner takes place, which components comprise the outer skin, the special lateral butt-joint plate, the end regions of the stringers of each fuselage section, which stringers are aligned coaxially relative to each other, and the stringer coupling which bridges and connects the two. Furthermore, it is proposed that the stringer coupling also be heated prior to assembly, for the purpose of tolerance compensation, and for it to be adjusted to the course of the adjacent components. In this arrangement, too, for each connecting position preferably two stringer couplings are used, each with an L-shaped cross section, in conjunction with stringers that are T-shaped in cross section. Moreover, the end regions of the abutting fuselage sections are also interconnected by way of the lateral butt-joint plate, preferably in a riveting process.

In practical application, riveting the stringer couplings to the outer skin and to the lateral butt-joint plate is carried out in several process steps. In this arrangement pilot holes are first made from the outside through the outer skin. Subsequently the already pre-installed stringer coupling is deinstalled, cleaned, deburred and a sealing compound is applied to it before said component is then reinstalled with the use of temporary auxiliary connection elements. In the next process step the holes are sequentially drilled to final dimension and are riveted with a precise fit. This installation method ensures that no drilling swarf reaches its way between the components to be interconnected, but said installation method is quite time-consuming.

SUMMARY

In an embodiment, the present invention provides a clamping device for an assembly of a stringer coupling in a region of a lateral butt joint between a first and a second fuselage section of an aircraft for coaxially connecting a respective first and second stringer of the first and the second fuselage sections, the stringer coupling intersecting a frame element profile in the region of the lateral butt joint. A supporting yoke is configured to bridge the frame element profile, from a first side to a second side, in an arc-shaped manner and includes a first end foot disposed so as to be supported by the stringer coupling on the first side of the frame element profile and a second end foot disposed so as to be supported by the stringer coupling on the second side of the frame element profile. The supporting yoke includes a middle tensioning hook configured to interact with the frame element profile such that the first and the second end feet are tensionable, by the tensioning hook, against the stringer coupling.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 a cross-sectional view of the lateral butt joint between two fuselage sections, FIG. 2 a clamping device used in the region of the lateral butt joint, FIG. 3 a top view of the clamping device according to FIG. 2, and FIG. 4 a lateral view of the clamping device according to FIG. 2.

DETAILED DESCRIPTION

Figure 1:
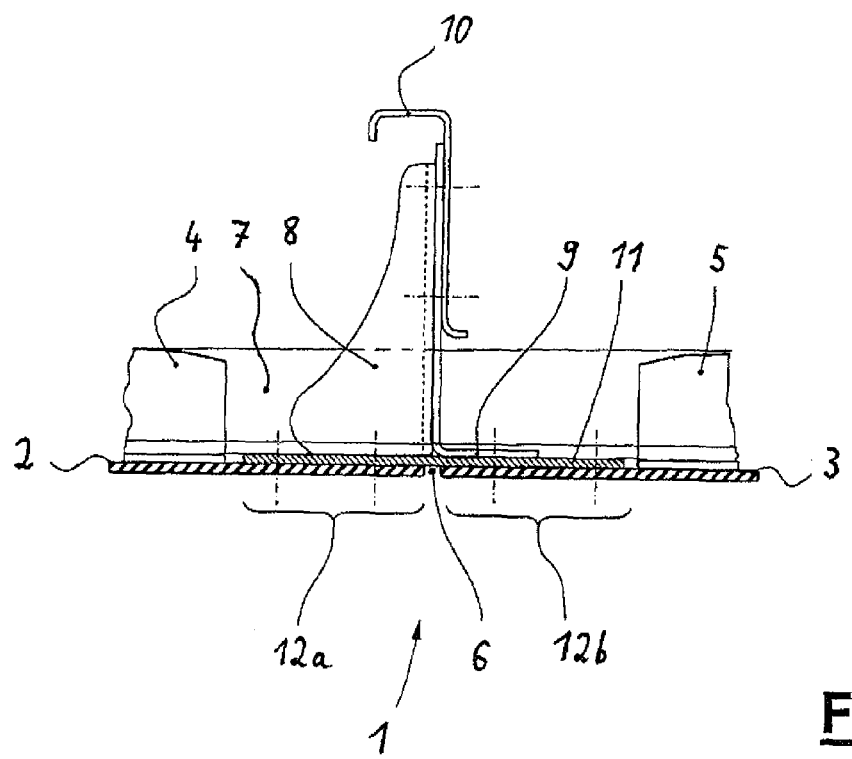

In an embodiment a string coupling is disposed in the region of a lateral butt joint between two adjacent fuselage sections of an aircraft for coaxially connecting in each case associated stringers, wherein the stringer coupling intersects the frame element profile in the region of the lateral butt joint. In another embodiment of the invention an installation process with the use of such a clamping device is provided.

An embodiment of the invention can be used in commercial aircraft with large-volume fuselages, which are formed by stringing together several approximately cylindrical fuselage sections. In this arrangement the fuselage structure principally comprises an outer skin comprising light metal or plastic, which outer skin on the inside is reinforced by means of stringers extending along the fuselage, and transversely is reinforced by means of approximately circular frame elements. The intersections between stringers and frame elements require special design solutions, on the one hand in order to ensure the required stability, and on the other hand to support simple and reliable assembly.

In an embodiment of the present invention, the assembly of a stringer coupling in the region of a lateral butt joint between two adjacent fuselage sections is performed in fewer process steps, in a highly-precise and time-saving manner.

In an embodiment of the invention a special clamping device is used for assembly that comprises a supporting yoke that bridges the frame element profile in an arc-shaped manner, with the two end feet of said supporting yoke on both sides of the footing being supported by the stringer coupling, and with said supporting yoke comprising a middle tensioning hook that interacts with the frame element profile in such a manner that the two end feet are tensionable against the stringer coupling.

An embodiment of the invention provides an advantage in particular in that riveting stringer couplings to the outer skin and to the lateral butt joint is possible in just a single process step. In this arrangement the clamping force that can be generated by means of the clamping device according to the invention is produced between the components to be connected, and consequently it is possible to do away with the temporary connecting elements that were hitherto required, and thus the associated intermediate process steps can be saved. Because of the clamping device, expeditious working while retaining the same high quality is possible because the clamping device is in a position to generate reproducible tensioning force for fixing the components to be interconnected. In this arrangement the function of the clamping device according to the invention is based on the recognition that the clamping force between the stringer coupling and the outer skin as outside components of the sandwich arrangement can be produced by way of the frame element profile that exists in the region of the lateral butt joint. The clamping force exerted by the device is introduced into the frame element and presses, against each other, the outer skins to be joined.

Furthermore, in an embodiment, the tensioning force between the ends of the supporting yoke of the clamping device and the respectively associated end feet is generated by way of an integrated tensioning mechanism. In this arrangement, according to a preferred embodiment, the tensioning mechanism can comprise an eccentric disc which can be rotated between a tensioned position and a loose position on a shaft that is held in one end or in both ends of the supporting yoke. Preferably, such an eccentric disc is arranged in the region of the two end feet of the clamping device. For the purpose of rotating the eccentric disc, a swiveling lever arranged thereon can be used, which, pointing outwards, can easily be manually adjusted.

Optionally, the tensioning mechanism can also comprise a return spring acting between the face end of the supporting yoke and an end piece designed as an individual component, which return spring is used for undoing the tension. To this extent the return spring is designed as a tension spring.

In addition to or instead of integration of the tensioning mechanism at the ends of the supporting yoke it is proposed that the arc-shaped supporting yoke in the middle region comprise a tensioning hook which is designed as a hook section, extending on the arc-shaped supporting yoke horizontally inwards, with a bearing section at the end, with said tensioning hook assuming the function of a leaf spring. This leaf-spring-like hook section is thus in a position to produce the required tensioning force by way of spring action, wherein based on the spring action a defined contact force can be generated. By activation of the eccentric discs the contact force is continuously increased, and on the other hand is sprung by the resilient hook section, so that it is not possible for over-tensioning of the clamping device to occur, which in an extreme case could otherwise damage the components to be connected.

In order to protect the components to be interconnected from being damaged, according to another embodiment improving the invention it is proposed that at least the two end feet of the clamping device in the contact region to the stringer coupling or of another adjacent component comprise a protective layer of plastic or Teflon. In this way, damaging metal contact is avoided, should the end foot of the clamping device comprise metal. As an alternative it is also possible for the end foot to be entirely manufactured from a suitable plastic material. To ensure ease of handling, the arc-shaped supporting yoke preferably comprises a metal, particularly preferably aluminum.

In an embodiment, in addition to the two end feet of the clamping device, the bearing section can also comprise a bearing arrangement comprising a plastic material or Teflon. In order to generate a stable bearing section, it is proposed that said bearing section comprise two end stops, horizontally spaced apart from each other by way of a support yoke, which end stops at their contact surfaces comprise said bearing sections of plastic or Teflon in order to protect the surface of the frame element profile.

In an embodiment, the clamping device described above can be used as follows for time-saving and highly precise assembly of the stringer couplings in the region of the lateral butt joint between two fuselage shells:

positioning the stringer coupling between the allocated stringers that extend coaxially relative to each other, fixing the positioned stringer couplings by means of the clamping device, and inserting the connecting elements between the stringer coupling, the stringer and the fuselage section.

After at least these assembly steps have been carried out, the clamping device can be removed, which only requires loosening the clamping mechanism.

The clamping device according to an embodiment of the invention is thus suitable for temporarily fixing the components to be interconnected. In this arrangement the connecting elements are preferably designed as rivets so that final connection of these components takes place by riveting. Apart from this it is, however, also imaginable to use other connecting elements, such as screws or a suitable adhesive. In the latter case the clamping device should, however, remain locked until such time as the adhesive has cured sufficiently.

Furthermore it is proposed that prior to positioning the stringer coupling a sealing compound be applied to the contact surface of the stringer coupling, which contact surface contacts the stringers. The sealing compound predominantly prevents corrosion between the components to be interconnected.

According to FIG. 1 there is a lateral butt joint 1 between a first fuselage section 2 and a second fuselage section 3. An associated first stringer 4 extends through the first fuselage section 2, and an associated second stringer 5 extends through the second fuselage section 3. The two stringers 4 and 5 end shortly before a gap 6 formed by the two fuselage sections 2 and 3 strung together. In order to bridge the gap 6 and in order to interconnect the stringers 4 and 5 that extend approximately coaxially relative to each other, a stringer coupling 7 is provided. In this arrangement the stringer coupling 7 intersects a frame element profile 8 that is arranged across the stringers 4 and 5 in the region of the lateral butt joint 1. In the region of the lateral butt joint 1 there is, furthermore, a lateral butt-joint plate 11 that bridges the gap 6, which lateral butt-joint plate 11 serves to seal the gap. The frame element profile 8 comprises an L-shaped lower part 9 that interacts with the stringer coupling 7, and an upper part 10 which is affixed on the limb side to the lower part 9, which upper part 10 comprises an angle arrangement at the end. The connection between the lower part 9 and the upper part 10 takes place by means of rivets (dot-dash lines). The lower part 9 of the frame element profile 8 as well as the stringer coupling 7, the lateral butt-joint plate 11, and the outer skin of the fuselage sections 2 and 3 are riveted together (dot-dash lines). In this arrangement a double row of rivets 12a on the first fuselage section 2 and likewise a double row of rivets 12b on the second fuselage section 3 are provided.

Figure 2:
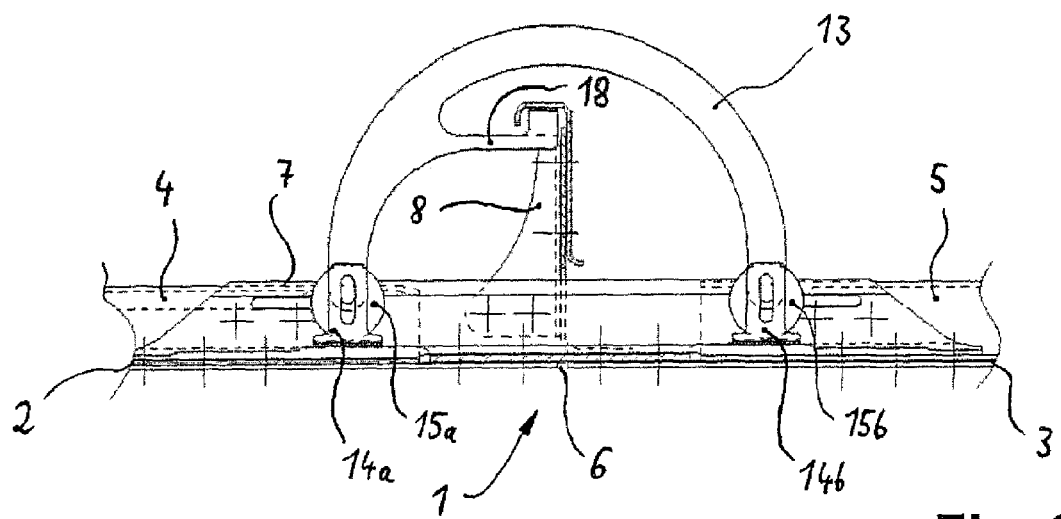

According to FIG. 2 a supporting yoke 13 of a clamping device is provided which bridges the frame element profile 8 of the lateral butt joint 1, with the end feet 14a and 14b of said supporting yoke 13 being supported, by the ends of the stringers 4 or 5, on the stringer coupling 7. Furthermore, on the arc-shaped supporting yoke 13 a middle tensioning hook extends horizontally. On the end, the middle tensioning hook 18 interacts with the frame element profile 8 in such a manner that the two end feet 14a and 14b press the stringer coupling 7 against the adjacent fuselage sections 2 or 3. In order to generate the tensioning force between the ends of the supporting yoke 13, which tensioning force is required for this, in the region of the end feet 14a and 14b a tensioning mechanism is provided which in each case comprises an eccentric disc 15a or 15b.

Figure 3:
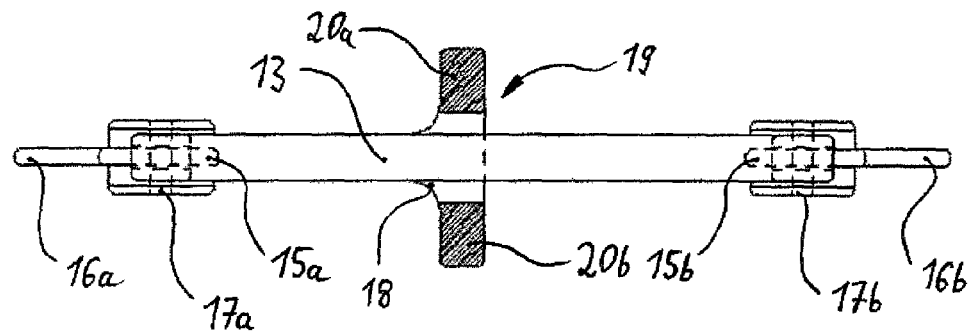

According to FIG. 3 the eccentric disc 15a and 15b of the tensioning mechanism is swivelable, in each case by an associated swiveling lever 16a or 16b, on a shaft 17a or 17b, in order to activate the tensioning mechanism between a tensioned position and a loose position. In this arrangement the two swiveling levers 16a and 16b are arranged so as to be directed towards the outside.

On the distal end of the tensioning hook 18 there is a bearing section that comprises two end stops 20a and 20b, one arranged on either side of the supporting yoke 13.

Figure 4:
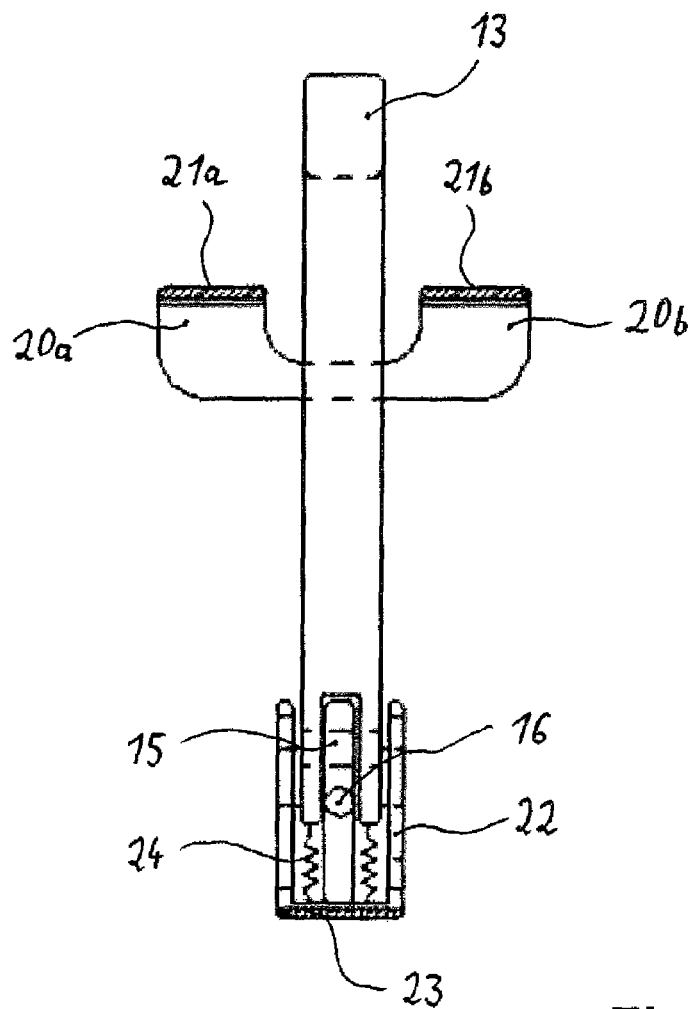

According to FIG. 4 the two end stops 20a and 20b comprise a protective layer 21a or 21b of Teflon. Analogous to this, on the face side, on end foot elements 22 (as an example) of the supporting yoke 13, which end foot elements 22 form separate components, likewise protective layers 23 (as an example) comprising Teflon have been applied.

Furthermore, between the face end of the supporting yoke 13 and the end piece 22 a return spring 24 is arranged which, designed as a tension spring, constantly exerts a contact force on the external circumference of the eccentric disc 15 (as an example) in order to more easily undo the tension applied by means of the clamping device.

In addition, it should be pointed out that "comprising" does not exclude other elements or steps, and "a" or "one" does not exclude a plural number. Furthermore, it should be pointed out that characteristics or steps which have been described with reference to the above exemplary embodiment can also be used in combination with other characteristics or steps of other possible exemplary embodiments.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

List of Reference Characters

1 Lateral butt joint
2 First fuselage section
3 Second fuselage section
4 First stringer
5 Second stringer
6 Gap
7 Stringer coupling
8 Frame element profile
9 Lower part
10 Upper part
11 Lateral butt-joint plate
12 Row of rivets
13 Supporting yoke
14 End foot
15 Eccentric disc
16 Swiveling lever
17 Shaft
18 Tensioning hook
19 Bearing section
20 End stop
21 Protective layer
22 End foot element
23 Protective layer
24 Return spring

What is claimed is:

1. A clamping device for an assembly of a stringer coupling in a region of a lateral butt joint between a first and a second fuselage section of an aircraft for coaxially connecting a respective first and second stringer of the first and the second fuselage sections, the stringer coupling intersecting a frame element profile in the region of the lateral butt joint, the clamping device comprising:

a supporting yoke configured to bridge the frame element profile from a first side to a second side in an arc-shaped manner and including a first end foot disposed so as to be supported by the stringer coupling on the first side of the frame element profile and a second end foot disposed so as to be supported by the stringer coupling on the second side of the frame element profile, wherein the supporting yoke includes a middle tensioning hook configured to interact with the frame element profile such that the first and the second end feet are tensionable by the tensioning hook against the stringer coupling.

2. The clamping device as recited in claim 1, further comprising a tensioning mechanism configured to generate a tensioning force between the first end foot and the second end foot of the supporting yoke.

3. The clamping device as recited in claim 2, wherein the tensioning mechanism includes a first eccentric disc and a second eccentric disc rotatable between a tensioned position and a loose position on a respective first shaft and second shaft and respectively disposed in the first foot and the second end foot of the supporting yoke.

4. The clamping device as recited in claim 3, wherein the tensioning mechanism includes a first swiveling lever and a second swiveling lever disposed respectively in the first end foot and the second end foot of the supporting yoke and configured to respectively rotate the first and the second eccentric disks.

5. The clamping device as recited in claim 2, wherein the tensioning mechanism includes a return spring acting between a face end of the supporting yoke and at least one end piece of the first end foot and the second end foot so as to undo a tension of the tensioning force.

6. The clamping device as recited in claim 1, wherein the first end foot and the second end foot respectively include an end piece and including a protective layer of plastic in a contact region to the stringer coupling.

7. The clamping device as recited in claim 1, wherein the tensioning hook is configured as a hook section extending horizontally inwards on the supporting yoke and includes a bearing section disposed on an end of the tensioning hook.

8. The clamping device as recited in claim 7, wherein the tensioning hook is configured as a leaf spring so as to exert a tensioning contact force.

9. The clamping device as recited in claim 7, wherein the bearing section includes a first end stop and a second end stop horizontally spaced apart from one another and each having a protective layer including Teflon.

* * * * *